United States Patent
Gerum et al.

(10) Patent No.: US 7,162,358 B2
(45) Date of Patent: Jan. 9, 2007

(54) FAULT DETECTION SYSTEM AND METHOD FOR DETECTING A FAULTY TEMPERATURE SENSOR IN MOTOR VEHICLES

(75) Inventors: Robert Gerum, Kottgeisering (DE); Frank Wilke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/242,004

(22) Filed: Oct. 4, 2005

(65) Prior Publication Data

US 2006/0021361 A1 Feb. 2, 2006

Related U.S. Application Data

(63) Continuation of application No. PCT/EP2004/003288, filed on Mar. 29, 2004.

(30) Foreign Application Priority Data

Apr. 11, 2003 (DE) ................................ 103 16 606

(51) Int. Cl.
B60T 7/12 (2006.01)
G05D 1/00 (2006.01)
(52) U.S. Cl. ....................... 701/107; 701/106
(58) Field of Classification Search ................ 701/102, 701/103, 107, 114, 115; 73/116, 119 R
See application file for complete search history.

(56) References Cited

U.S. PATENT DOCUMENTS 4,432,210 A   2/1984  Saito
5,560,200 A * 10/1996 Maus et al. .................... 60/274
5,742,920 A *  4/1998 Cannuscio et al. .......... 701/102
6,101,442 A *  8/2000 Lewandowski et al. ..... 701/114
6,101,987 A *  8/2000 Saur et al. .................. 123/41.1
6,714,854 B1 * 3/2004 Linenberg et al. .......... 701/113
2004/0044462 A1* 3/2004 Linenberg et al. .......... 701/113

FOREIGN PATENT DOCUMENTS

| EP | 1 273 781 A | 1/2003 |
|---|---|---|
| JP | 60 076416 A | 4/1985 |
| JP | 60 099710 A | 6/1985 |
| JP | 62 096843 A | 5/1987 |
| KR | 2001059152 A | 7/2001 |

* cited by examiner

Primary Examiner—John T. Kwon
(74) Attorney, Agent, or Firm—Crowell & Moring LLP

(57) ABSTRACT

An error detection system is provided for identifying a defective temperature sensor in motor vehicles including an internal combustion engine and at least one electronic control unit that is provided with a mechanism for detecting the immobilization time between turning off and restarting the internal combustion engine. An ambient-air temperature value determined by an ambient-air temperature sensor is compared with a coolant temperature value determined by at least one coolant temperature sensor in the electronic control unit after restarting the internal combustion engine if the detected immobilization time prior to restarting the internal combustion engine exceeds a predefined minimum time value. An error of the ambient temperature sensor is recognized when the difference between the coolant temperature value and the ambient-air temperature value is at least quantitatively greater than a given threshold value.

11 Claims, 1 Drawing Sheet

FAULT DETECTION SYSTEM AND METHOD FOR DETECTING A FAULTY TEMPERATURE SENSOR IN MOTOR VEHICLES

CROSS-REFERENCE TO RELATED APPLICATIONS

This application is a continuation of PCT Application No. PCT/EP2004/003288 filed on Mar. 29, 2004, which claims priority to German Application No. 103 16 606.8 filed Apr. 11, 2003.

BACKGROUND AND SUMMARY OF THE INVENTION

The invention relates to a fault detection system for detecting a faulty temperature sensor in motor vehicles having an internal-combustion engine and at least one electronic control unit, which includes devices for detecting the downtime between the switching-off and the new start of the internal-combustion engine.

A fault detection system of the above-mentioned type is known, for example, from European Patent document EP 1 273 781 A2. In this case, only the temperature signal is taken into account, which signal is supplied by the temperature sensor to be diagnosed.

It is an object of the invention to improve upon a fault detection system of the above-mentioned type, on the one hand, with respect to its precision and, on the other hand, with respect to its simplicity as well as with respect to its accuracy, i.e., its exclusion of an incorrect fault detection.

This problem is solved by providing a fault detection system and method for detecting a faulty temperature sensor in motor vehicles having an internal-combustion engine and at least one electronic control unit, which includes devices for detecting the downtime between the switching-off and the new start of the internal-combustion engine. After a new start of the internal-combustion engine, an ambient-air temperature value determined by an ambient-air temperature sensor is compared in the electronic control unit with a coolant temperature value determined by at least one coolant temperature sensor if the detected downtime before the new start of the internal-combustion engine was greater than a defined minimum time value. A fault of the ambient-air temperature sensor is detected if the difference between the coolant temperature value and the ambient-air temperature value, at least with respect to the amount, is greater than a defined threshold value.

According to the invention, in the case of a fault detection system for detecting a faulty temperature sensor in motor vehicles having an internal-combustion engine and having at least one electronic control unit, which has devices for detecting the downtime between the switching-off and the new start of the internal-combustion engine, after a new start of the internal-combustion engine, an ambient-air temperature value determined by an ambient-air temperature sensor is compared in the electronic unit with a coolant temperature value determined by a coolant temperature sensor if the detected downtime before the new start of the internal-combustion engine was greater than a defined minimum time value. A fault of the ambient-air temperature sensor is detected if the difference between the coolant temperature value and the ambient-air temperature value, at least with respect to the amount, is greater than a defined threshold value.

The invention is based on the recognition that an easy diagnosis may be achieved by performing plausibility monitoring of temperature values of different temperature sensors which, however, have to be in a defined relationship to one another under certain operating conditions. As a result, complicated temperature models, which are normally used for diagnostic purposes involving temperature sensors, will not be necessary.

Other objects, advantages and novel features of the present invention will become apparent from the following detailed description of the invention when considered in conjunction with the accompanying drawings.

DETAILED DESCRIPTION OF THE DRAWING

Figure 1:
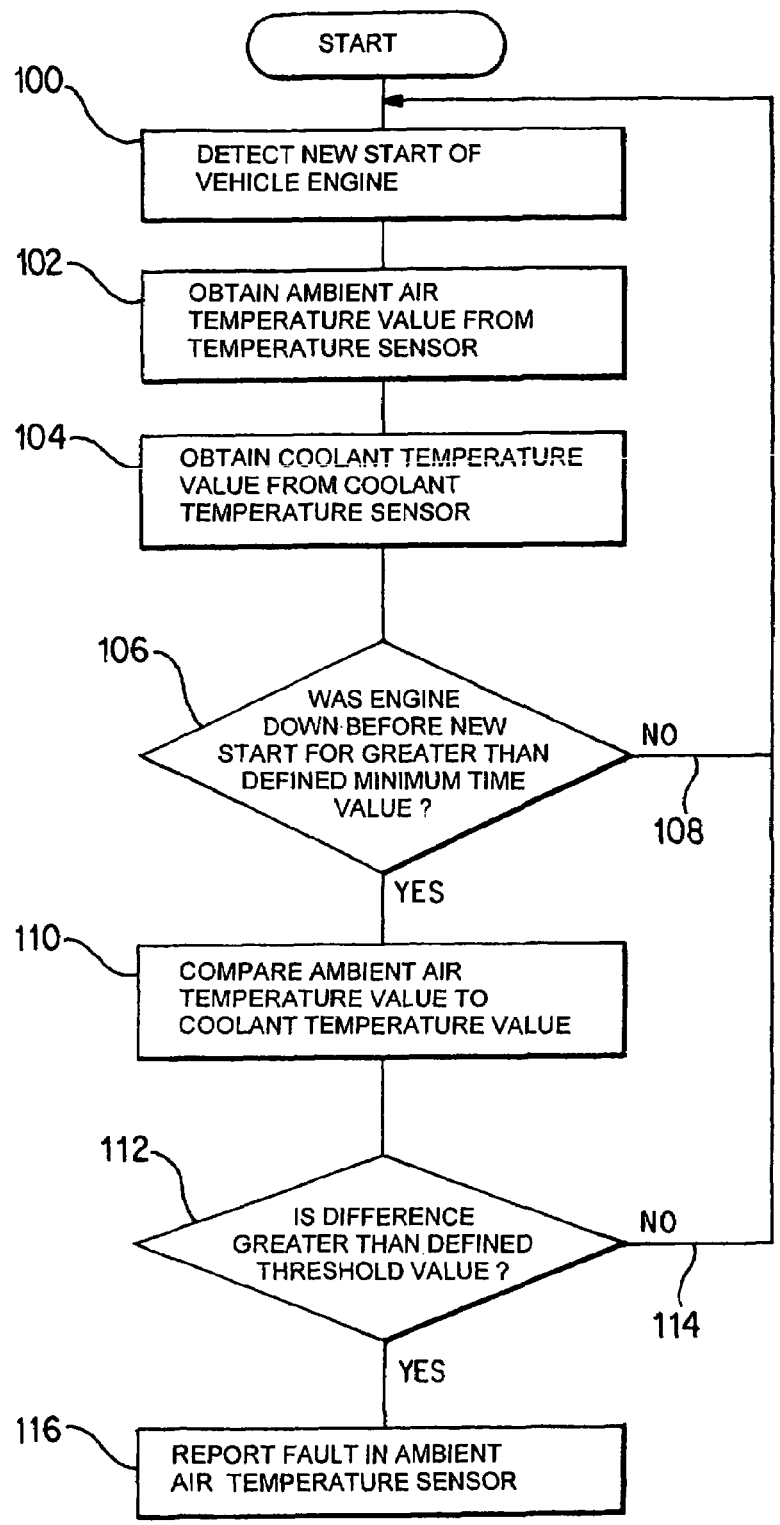
FIG. 1 is a flow chart illustrating an exemplary operation of the fault detection system and method according to the present invention.

Referring to FIG. 1, an exemplary flow chart of the fault detection system and method according to the present invention is provided. The method proceeds by detecting a new start of a vehicle engine (step 100). The ambient air temperature value is obtained from an ambient air temperature sensor (step 102) and a vehicle coolant temperature value is obtained from a vehicle coolant temperature sensor (step 104). The method inquires as to whether the vehicle engine was "down" or off prior to the new start for a time period greater than a defined minimum time period (step 106). If not, then the method continues to detect another new start of the vehicle engine (see loop 108). If, however, the engine was down for greater than the defined minimum time value, the method compares the ambient air temperature value to the coolant temperature value (step 110). The method then determines whether the difference between the ambient air temperature value and the coolant temperature value, at least with respect to an amount, is greater than a defined threshold value (step 112). If not, the process loops back via line 114. If, however, the difference is greater than the defined threshold value, then a fault of the ambient air temperature sensor is detected. Such a fault can then be reported such that proper steps may be taken (step 116).

The fault detection routine preferably takes place in a repetitive manner, for example, in a time pattern of 100 ms.

The fault detection routine may take place as a function of additional conditions (in addition to the presence of a (new) start of the internal-combustion engine and to the presence of a preceding minimum downtime). It can be defined, for example, that a fault detection routine according to the invention will take place only if:

the internal-combustion engine is idling, or if
the ambient-air temperature value is within a defined temperature band; for example, between 2° C. (minimal ambient air temperature) and 35° C. (maximal ambient air temperature), or if
the coolant temperature value or another temperature value proportional to the internal-combustion engine temperature is above a defined minimal coolant temperature for the connecting of the diagnosis, or if
a maximal engine running duration (if required, only when idling) has not yet elapsed after a (new) start of the internal-combustion engine.

Furthermore, at least no fault of the temperature sensor being diagnosed, or of the temperature sensors for determining the coolant temperature value, should have been detected.

As a further aspect of the invention, a fault of the ambient-air temperature sensor is detected only if the difference between the coolant temperature value and the ambient-air temperature value, at least for a defined time period, with respect to its amount is greater than a defined threshold value.

The coolant temperature value is, preferably, formed as a mean value from the cooler outlet temperature (thus the coolant temperature at the cooler output) and the internal-combustion engine outlet temperature (thus the coolant temperature at the coolant output of the internal-combustion engine).

As an advantageous further development of the invention, the last-measured ambient-air temperature value is stored in the control unit before the internal-combustion engine is switched off. The stored last-measured ambient-air temperature value is then compared with the ambient-air temperature value measured at the new start. The fault detection is suppressed if the difference between the last-measured ambient-air temperature value before the switching-off of the internal-combustion engine and the ambient-air temperature value measured at the new start is greater than a defined starting temperature difference.

As a result, an incorrect fault detection due to special cases, which could lead to unusual temperature differences between the coolant temperature value and the ambient-air temperature value, is prevented. For example, such situations may occur if:
  while the weather is cold, the vehicle was parked in a warm garage overnight; for the new start of the internal-combustion engine, the garage door is opened and cold ambient air enters; or
  the ambient-air temperature sensor normally mounted under the engine hood is heated up for a short time by sun radiation before a new start of the internal-combustion engine.

In a further advantageous embodiment of the invention, a first measured ambient-air temperature value is at first stored in the control unit during the new start of the internal-combustion engine and is compared with a second ambient-air temperature value measured again after a defined engine running duration. The fault detection is suppressed if the difference between the first and the second ambient-air temperature values is greater than a defined operating temperature difference.

As a result, it is detected whether the ambient-air temperature value is "frozen". This would, therefore, lead to a different fault detection than by means of the above-mentioned plausibility test involving the coolant temperature value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fault detection method for detecting a faulty temperature sensor in a motor vehicle having an internal combustion engine and at least one electronic control unit, said control unit being configured to detect a downtime between a switching-off and a new start of the internal-combustion engine, the method comprising the acts of:
    detecting a new start of the internal-combustion engine of the vehicle;
    comparing an ambient-air temperature value determined by an ambient-air temperature sensor with a coolant temperature value determined by at least one coolant temperature sensor if the detected downtime before the new start of the internal-combustion engine exceeds a defined minimum time value; and
    determining a fault of the ambient-air temperature sensor if a difference between the coolant temperature value and the ambient-air temperature value, at least with respect to an amount, is greater than a defined threshold value.

2. The method according to claim 1, wherein the determining act further comprises the act of determining the fault of the ambient-air temperature sensor if the difference between the coolant temperature value and the ambient-air temperature value is, at least for a defined time period, greater with respect to the amount than the defined threshold value.

3. The method according to claim 1, further comprising the act of forming the coolant temperature value as a mean value from a cooler outlet temperature and an internal-combustion engine outlet temperature.

4. The method according to claim 2, further comprising the act of forming the coolant temperature value as a mean value from a cooler outlet temperature and an internal-combustion engine outlet temperature.

5. The method according to claim 1, further comprising the acts of:
    storing a last-measured ambient-air temperature value before the switching-off of the internal combustion engine in the control unit, wherein said stored last-measured ambient-air temperature value is compared with the ambient-air temperature value obtained after the new start is detected; and
    suppressing the fault detection method if the difference between the last-measured ambient-air temperature value before the switching-off of the internal-combustion engine and the ambient-air temperature value obtained at the new start is greater than a defined starting temperature difference.

6. The method according to claim 3, further comprising the acts of:
    storing a last-measured ambient-air temperature value before the switching-off of the internal combustion engine in the control unit, wherein said stored last-measured ambient-air temperature value is compared with the ambient-air temperature value obtained after the new start is detected; and
    suppressing the fault detection method if the difference between the last-measured ambient-air temperature value before the switching-off of the internal-combustion engine and the ambient-air temperature value obtained at the new start is greater than a defined starting temperature difference.

7. The method according to claim 1, further comprising the acts of:
    upon detecting the new start of the internal-combustion engine, a first measured ambient-air temperature value is stored and then compared with a second ambient-air temperature value obtained after a defined engine running time duration; and
    suppressing the fault detection method if the difference between the first measured ambient-air temperature value and the second ambient air-temperature value is greater than a defined operating temperature difference.

8. The method according to claim 3, further comprising the acts of:

upon detecting the new start of the internal-combustion engine, a first measured ambient-air temperature value is stored and then compared with a second ambient-air temperature value obtained after a defined engine running time duration; and suppressing the fault detection method if the difference between the first measured ambient-air temperature value and the second ambient air-temperature value is greater than a defined operating temperature difference.

9. The method according to claim 5, further comprising the acts of:

upon detecting the new start of the internal-combustion engine, a first measured ambient-air temperature value is stored and then compared with a second ambient-air temperature value obtained after a defined engine running time duration; and suppressing the fault detection method if the difference between the first measured ambient-air temperature value and the second ambient air-temperature value is greater than a defined operating temperature difference.

10. The method according to claim 6, further comprising the acts of:

upon detecting the new start of the internal-combustion engine, a first measured ambient-air temperature value is stored and then compared with a second ambient-air temperature value obtained after a defined engine running time duration; and suppressing the fault detection method if the difference between the first measured ambient-air temperature value and the second ambient air-temperature value is greater than a defined operating temperature difference.

11. A vehicle system for detecting a faulty ambient-air temperature sensor in a vehicle, comprising:

an internal combustion engine arranged in the vehicle;

at least one electronic control unit arranged in the vehicle, said at least one electronic control unit being operatively configured to detect a downtime between a switching-off of the internal-combustion engine and a new starting of the internal-combustion engine;

wherein, after a new start of the internal-combustion engine is detected, an ambient-air temperature value determined by an ambient-air temperature sensor is compared in said at least one electronic control unit with a coolant temperature value determined by at least one coolant temperature sensor if a detected downtime before the new starting of the internal-combustion engine was greater than a defined minimum time value; and further wherein said at least one electronic control unit detects a fault of the ambient-air temperature sensor if a difference between the coolant temperature value and the ambient-air temperature value, at least with respect to an amount, exceeds a defined threshold value.

* * * * *